(12) United States Patent
Kopf et al.

(10) Patent No.: US 8,908,402 B2
(45) Date of Patent: Dec. 9, 2014

(54) MODULAR HIGH-FREQUENCY CONVERTER AND METHOD FOR OPERATING THE SAME

(71) Applicant: Siemens Aktiengesellschaft, München (DE)

(72) Inventors: Michael Kopf, Feucht (DE); Marcel Lutze, Nürnberg (DE); Mirjam Mantel, München (DE); Markus Reinhard, Nürnberg (DE); Stefan Völkel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/196,429

(22) Filed: Mar. 4, 2014

(65) Prior Publication Data
US 2014/0254229 A1    Sep. 11, 2014

(30) Foreign Application Priority Data

Mar. 5, 2013  (DE) .......................... 10 2013 203 706

(51) Int. Cl.
*H02M 7/5387*  (2007.01)
(52) U.S. Cl.
USPC ................ 363/71; 363/98; 323/267; 323/271
(58) Field of Classification Search
USPC ......... 363/65–71, 98, 132; 323/225, 267, 271
See application file for complete search history.

(56) References Cited

U.S. PATENT DOCUMENTS

| | | | | |
|---|---|---|---|---|
| 8,054,657 B2 * | 11/2011 | Gruber et al. | ................... | 363/36 |
| 2005/0017699 A1 * | 1/2005 | Stanley | ......................... | 323/282 |
| 2013/0106256 A1 * | 5/2013 | Mizukoshi et al. | ......... | 310/68 D |
| 2013/0134782 A1 * | 5/2013 | Seon | .............................. | 307/31 |
| 2013/0187473 A1 * | 7/2013 | Deboy et al. | .................... | 307/82 |

OTHER PUBLICATIONS

Lambertz Lukas et al; "Modularer Hochfrequenz Umrichter für Fahrzeugantriebe"; Institut für Leistungselektronik und Steuerungen, Universität der Bundeswehr München; VDE Verlag; EMA Fachtagung Sep. 8-9, 2010 in Aschaffenburg; pp. 47-53;ISBN 978-3-8007-3311-8; XP009163159; 2010; DE; Sep. 8, 2010.

Dipl -ing. Mayer A. et al; "Control concept of the Modular High Frequency—Converter for vehicle applications", International Exhibition&Conference for Power Electronics, Intelligent Motion and Power Quality 2011 (PCIM Europe 2011), Nuremburg, Germany May 17-19, 2011; vol. 1; pp. 540-545; ISBN: 978-1-61839-061-5; 2011.

* cited by examiner

*Primary Examiner* — Jessica Han
(74) *Attorney, Agent, or Firm* — Henry M. Feiereisen LLC

(57) ABSTRACT

A modular high-frequency converter includes submodules, each having an input-side half bridge and a DC link circuit with a DC link capacitance connected in parallel to the half bridge. A DC link circuit voltage drop across the DC link capacitance of each submodule is controlled to a target voltage by adjusting a duty cycle with a closed-loop control structure having a pilot control and a downstream closed-loop error control. Within the framework of the pilot control, a target value for each duty cycle and a target value for the supply current are determined, using a mathematical model of the converter, based on the load-side output currents flowing out of the DC link voltage circuits and on target values of the DC link circuit voltages. Switch position parameters, which map the effect of the switch positions of the input-side half bridges, are each replaced by an associated duty cycle.

12 Claims, 3 Drawing Sheets

US 8,908,402 B2

MODULAR HIGH-FREQUENCY CONVERTER AND METHOD FOR OPERATING THE SAME

CROSS-REFERENCES TO RELATED APPLICATIONS

This application claims the priority of German Patent Application, Serial No. 10 2013 203 706.6, filed Mar. 5, 2013, pursuant to 35 U.S.C. 119(a)-(d), the content of which is incorporated herein by reference in its entirety as if fully set forth herein.

BACKGROUND OF THE INVENTION

The present invention relates to a modular high-frequency converter. The invention further relates to a method for operating such a converter.

The following discussion of related art is provided to assist the reader in understanding the advantages of the invention, and is not to be construed as an admission that this related art is prior art to this invention.

Conventional modular high-frequency converters (abbreviated to MHF converter) are designed to convert a DC voltage from a traction battery of the vehicle into a number of AC voltages. The individual AC voltages in such cases are generated by a number of submodules which are connected in series into the supply circuit of the traction battery. Each submodule is connected here on the input side to the supply circuit via a half bridge. To generate the AC voltage each submodule has a single-phase full bridge (H bridge) on its output side, which is connected via a load circuit to a phase winding of the drive motor of the vehicle. Within the submodule the input-side half bridge and the full bridge are connected in parallel, together with a link circuit capacitance, in a (DC) link circuit.

In normal operation (drive mode) of the MHF converter, in which electrical power is transported via the submodules of the converter out of the supply circuit into the respective load circuit, the input-side half bridges of the submodules are operated in collaboration with an inductance arranged in the supply circuit as boost converters. For this purpose the DC link circuit capacitances of the submodules are usually switched into the supply circuit with offset clocking. For this purpose, the input-side half bridges are activated as a rule with periodic carrier signals which are offset by the same phase angle.

In addition to the drive mode, the input-side half bridges of the submodules can also be operated in a feedback mode, in which electrical power is fed back from the load circuit via the respective associated submodule into the supply circuit.

The DC link circuit voltages of the submodules are regulated individually for each submodule by variation of the sampling cycle (also known as the control factor, pulse-pause ratio or duty cycle), with which the respective input-side half bridge of the respective submodule is activated.

It would therefore be desirable and advantageous to obviate prior art shortcomings and to provide an improved MHF converter and an improved method for its operation.

SUMMARY OF THE INVENTION

According to one aspect of the present invention, a method for operating a modular high-frequency converter having a plurality of submodules which are connected in series on an input side to a supply circuit supplied by a DC voltage source via an inductance, wherein each submodule has an associated input-side half bridge and a DC link circuit connected downstream of the associated input-side half bridge and wherein a DC link circuit capacitance is connected in parallel with the associated input-side half bridge, includes clocking the associated input-side half bridge with a predetermined duty cycle so as to connect the DC link circuit capacitance of each submodule to the supply circuit; controlling the DC link circuit voltage dropping across the DC link circuit capacitance of each submodule to a predetermined voltage target value by adjusting the predetermined duty cycle with a closed-loop control structure having a pilot control and a closed-loop error control connected downstream of the pilot control; determining, in conjunction with the pilot control and by using a model that mathematically models approximately an interaction of currents and voltages in the supply circuit and currents and voltages in the submodules, a target duty cycle value for each duty cycle and a target current value for the supply current based on load-side output currents flowing out from the DC link circuits of the submodules and based on the predetermined target voltage values of the DC link circuit voltages; in the model, replacing switch position parameters that map an effect of switch positions of the input-side half bridges based on the determined duty cycle value; and operating the converter with the replaced switch position parameters.

According to another aspect of the present invention, a modular high-frequency converter includes a plurality of submodules having input sides connected in series via an inductance in a supply circuit supplied by a DC voltage source, wherein each submodule comprises an input-side half bridge, a DC link circuit connected downstream of the input-side half bridge and a DC link circuit capacitance connected in parallel with the input-side half bridge, and a control device configured to automatically carry out the aforedescribed method.

The invention is based on an MHF converter comprising a number of submodules. The submodules here are connected in series as per specification on the input side via an inductance into a supply circuit fed by a DC voltage source. On its input side each submodule has a half bridge (called the input bridge below) with which the submodule is connected into the supply circuit. The input bridge is connected within the submodule downstream from a (DC) link circuit, within which the input bridge is connected in parallel to a DC link circuit capacitance—especially in the form of one or more capacitors.

On the output side each submodule preferably has an output circuit, via which the submodule is connected in accordance with specification to a load circuit. Depending on the type of load disposed in the load circuit, the output circuit can differ in its nature. In particular the output circuit—in a similar way to the known MHF converter—can involve a single-phase full bridge for generating a single-phase AC voltage for the load circuit. As an alternative to this the output circuit can be embodied as a multiphase, especially three-phase, full bridge (pulse converter) for generating a corresponding multiphase AC voltage. Another alternative is for the output circuit to be embodied as a DC-DC converter for generating a DC voltage in the load circuit. In the last-mentioned embodiment the output circuit serves especially for downwards conversion of the DC link circuit voltage into a low voltage for the supply of electrical control devices, lighting and low voltage drives and/or for charging a low-voltage battery. Provided the submodule is intended for load-side output of a DC voltage, the output circuit can optionally also be omitted entirely, so that in this case the DC link circuit passes directly into the load circuit. The MHF converter can in accordance with the invention especially include submodules with different output circuits. In one exemplary embodiment the MHF converter includes four submodules, each of which contains a three-phase full bridge (pulse converter) as its output circuit, as well is a fifth submodule with a buck converter as its output circuit.

The MHF converter is especially designed for use in the vehicle drive of an electric vehicle. In this application the traction battery (high-voltage battery) of the vehicle is designed as the DC voltage source for the supply circuit. The load to be connected to the submodule on the output side here especially involves an electric motor or a phase winding of such a motor. Preferably in this case each phase winding of the electric motor is assigned a separate submodule. As an alternative to this however, within the framework of the invention, a number of phase windings of a multiphase electric motor can be connected to a common submodule. In a specific application of the invention a number of electric motors—which for example serve to selectively drive different wheels of the vehicle—can be activated by different submodules of the MHF converter.

As part of the method the DC link circuit capacitance of each submodule, clocked in each case with a predetermined duty cycle by the associated input half bridge, is connected into the supply circuit. The DC link circuit voltage dropping via the DC link circuit capacitance of the submodule is regulated to a predetermined voltage target in such cases by specifying the associated duty cycle.

In accordance with the invention, for regulation of the DC link circuit voltages, a regulation structure with two degrees of freedom is included, which comprises a pilot control and a closed-loop subsequent error control connected downstream from said pilot control. At the heart of the pilot control in this case is a model which approximately mathematically maps the interaction of the currents and voltages in the supply circuit and the submodules in accordance with Kirchhoff's rules. The model is preferably implemented in the form of an equation system.

As part of the pilot control, target values for the DC link circuit voltages and the output currents of the submodules are included as input variables for the model. The "output current" here refers to the current flowing out in the DC link circuit of a submodule—the current flowing into the respective DC link circuit from the associated load circuit is accordingly evaluated as the output current with a negative sign. The model further contains switching position parameters, which map the influence of the switching positions of the input bridges (more precisely the influence of the position of the switching elements disposed in the half bridges) on the voltages and currents in the MHF converter. The switching position parameters typically involve binary parameters which assume the value "0" if the associated link circuit capacitance is switched into the supply circuit and which assume the value "1" if the DC link circuit capacitance is uncoupled in switching terms from the supply circuit.

By means of the model—especially by resolving the equation system forming the model—a target value for each duty cycle and also a target value for the supply current is determined as part of the pilot control. The target values determined by the pilot control in such cases represent specifications with large granularity and which change slowly over time which can be finely adjusted by the subsequent closed-loop control.

In accordance with the invention the model used in the pilot control-compared to an exact mapping of the currents and voltages in the MHF converter according to Kirchhoff's rules—is simplified to the extent that, for the determination of the target values specified above, the switching position parameters will be replaced in each case by the assigned duty cycle, i.e. by that duty cycle with which the associated input bridge is activated. Preferably additional temporal changes of the DC link circuit voltages and of the supply current are ignored in the model (i.e. set to the value zero).

The inventive closed-loop control method makes possible an especially flexible, yet still precise and stable control of the MHF converter at different operating points. Thus the method also especially makes it possible to supply the load circuit by means of single-phase output bridges at a low to disappearing output frequency. Furthermore the method makes possible, within the system's own limitations, the simultaneous supply of loads of different types, especially the simultaneous supply of AC consumers and DC consumers. In addition the method is especially suitable for the operation of the MHF converter in supplying a number of loads with greatly differing power consumption.

Basically, within the framework of the pilot control, time-discrete measured values of the output currents (e.g. values, especially measured values, which the respective output current assumes at a defined point in time) can be included as input variables for the model. Preferably, within the framework of the pilot control, instead of time-discrete values, average current values over time of the output currents are taken into account as input variables, since it is known that this significantly contributes to the stable function of the pilot control. In an especially expedient version of the method the average current values of the output currents are determined by means of a recursive average value filter. As an alternative to the direct measurement of the output currents, the output currents are calculated even before the recursive averaging from measured values of the load-side AC currents and by taking into account the switch positions in the output circuits of the submodules.

Preferably the target values cited here are determined by the pilot control by numerical resolution of the model in an iterative optimization method, for example using the Levenberg-Marquardt algorithm.

The voltage of the DC voltage source (referred to below as the "supply voltage") is included as an additional input variable in the model implemented in the pilot control. The supply voltage can be measured as part of the invention. In an alternate embodiment of the method, much easier to implement yet still sufficiently precise for most applications, a constant predetermined assumed value is used for the supply voltage. Fluctuations of the supply voltage (when the MHF converter is used in an electric vehicle, especially fluctuations of the battery voltage) are ignored in such cases. As another alternative, as part of the pilot control, a value of the supply voltage calculated by state reconstruction is used. This makes it possible, by comparison with the constant specification of the supply voltage, to enhance the precision of the pilot control without having to take into account the hardware outlay associated with voltage measurement.

For the same reasons, in an expedient variant of the method, an (actual) value of the supply current also needed for subsequent error control is calculated in a state reconstruction, wherein, as an alternative, detecting the supply current by measuring is also possible within the framework of the invention.

In an expedient variant of the method any periodic disruption to the DC link circuit voltages which might be present can be compensated for wholly or in part by applying a corresponding periodic compensation signal to the duty cycles. This relieves the strain on the subsequent error control. The function of the closed-loop control with two degrees of freedom is further stabilized overall. This variant of the method is used especially if the MHF converter is operated for supplying single-phase AC current consumers as the load, since the output currents drawn by such a load always have a marked ripple.

In an expedient embodiment of the invention the MHF converter carries out the inventive method automatically. For this purpose it comprises a control device, which is configured in terms of circuitry and/or programming to carry out the inventive method, especially in one of the embodiment variants described above. The control device in such cases especially comprises a microcontroller in which a control program (firmware) automatically executing during operation of the converter is implemented as an executable program. As an alternative or in addition, within the framework of the invention, the control device can however also include at least one non-programmable hardware switching circuit (e.g. an ASIC), in which the function for automatically carrying out the method or a part thereof is implemented with circuit technology means.

The control device can be formed within the framework of the invention by a single (central) control unit which activates all submodules together, thus for example by a single microcontroller. As an alternative or in addition to this however the control device can also be structured within the framework of the invention entirely or partly decentrally, in that each submodule is (at least also) assigned its own control unit.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
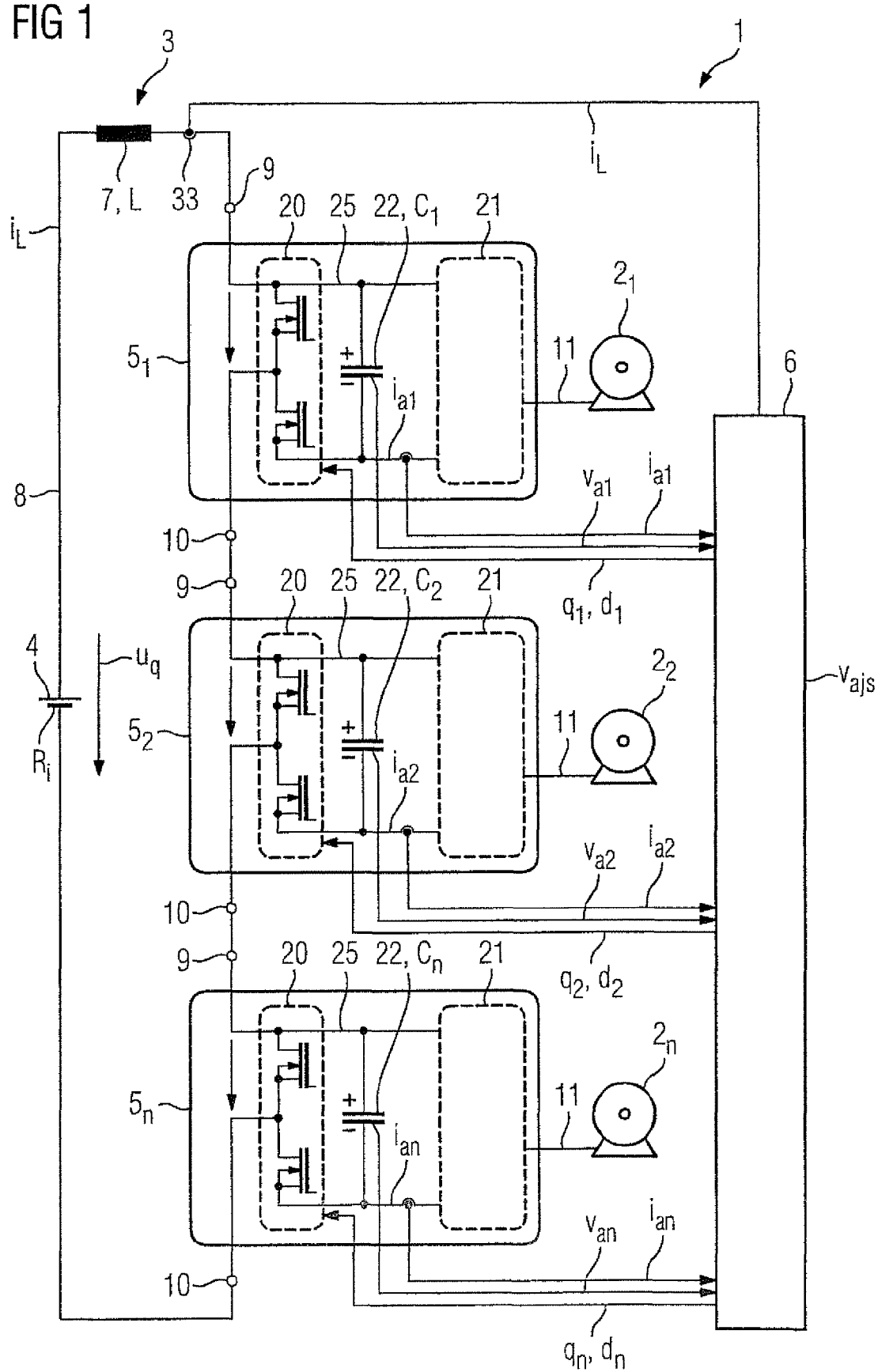
FIG. 1 shows schematically in a simplified electronic circuit diagram an MHF converter with a number of submodules connected in series, wherein each of the submodules comprises an input-side half bridge (input bridge), an output-side single-phase full bridge (output bridge) and a (DC) link circuit with a link circuit capacitance, and also with a control unit for activating the submodules.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a vehicle drive 1 for an electric vehicle (not shown in detail). The vehicle drive 1 includes a number of electric loads $2_j$ (with j=1, 2, ..., n) for example. Each of the loads $2_j$ can involve a drive motor or a phase winding of a drive motor of the vehicle. At least one of the loads $2_j$ can, as an alternative, involve another consumer in the vehicle, especially a DC consumer such as e.g. the on-board network or its low-voltage battery.

The vehicle drive 1 further includes an (MHF) converter 3, which supplies the loads $2_j$ with electrical power from an electrical DC voltage source. The DC voltage source, in the example shown, involves the (traction) battery 4 (also: high-voltage battery) of the vehicle.

In the example in accordance with FIG. 1, the converter 3 includes a number of submodules $5_j$ (with j=1, 2, ..., n). In the example shown the number of submodules $5_j$ is selected merely for reasons of simplification to be the same as the number of loads $2_j$ to be supplied. In the general case a number of loads $2_j$ can be supplied by one of the submodules $5_j$.

The converter 3 also includes a central control unit 6 as a control device as well as additionally an inductance 7.

The inductance 7, which is realized in terms of circuit technology especially by one or more coils, and the submodules $5_j$ are connected to the battery 4 in a series circuit via a supply circuit (referred to as the battery circuit 8 below). Each submodule $5_j$ is connected here by two input terminals 9 and 10 into the battery circuit 8.

On the load side each of the submodules $5_j$ is connected in each case via a load circuit 11 to the associated load $2_j$.

Figure 2:
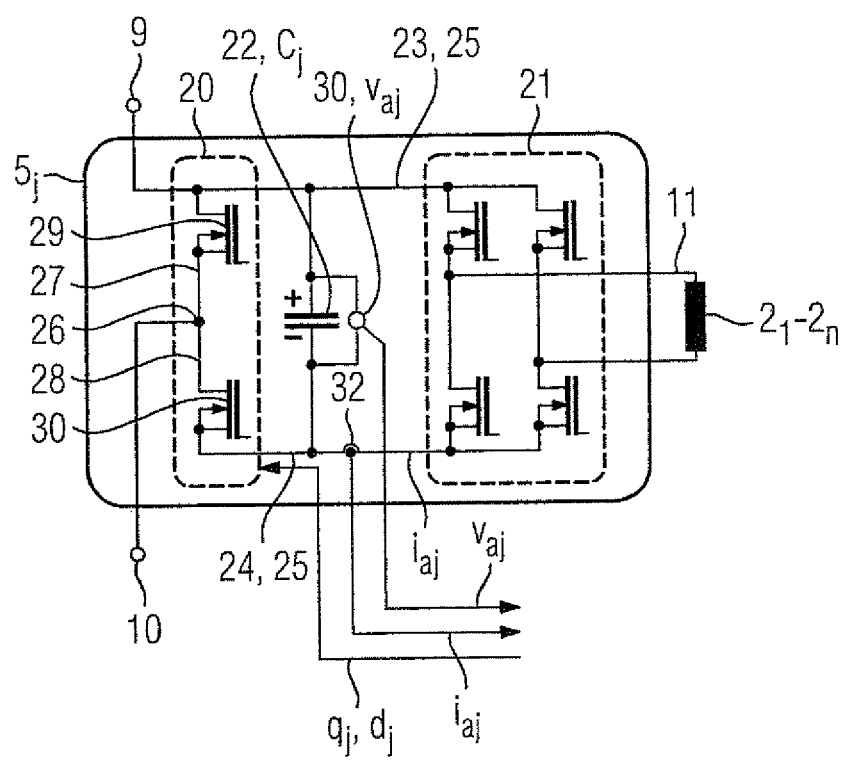
FIG. 2 shows one of the submodules in accordance with FIG. 1 in an enlarged diagram.

One of the submodules $5_j$ is shown in FIG. 2 in greater detail by way of example. As can be seen in this figure, the submodule $5_j$ has a half bridge, referred to below as the input bridge 20, on its input side. Furthermore the submodule $5_j$ has an output circuit 21 on the load side. The submodule $5_j$ also includes a DC link circuit capacitance 22 in the form of a capacitor, via which a DC link circuit voltage $v_{aj}$ (with j=1, 2, ..., n) drops. The input bridge 20, the output circuit 21 and the DC link circuit capacitance 22 are connected here in parallel to one another between a plus rail 23 and a minus rail 24 of a (DC) link circuit 25.

The input bridge 20 has two branches 27 and 28 separated by a central tap 26, of which the branch 27 extends between the central tap 26 and the plus rail 23, and the branch 28 between the central tap 26 and the minus rail 24. Arranged in each of the branches 27, 28 is a (semiconductor) switch 29 or 30, which is preferably formed in each case by a MOSFET. The input terminals 9 and 10 of each submodule $5_j$ are connected on both sides of the switch 29 to the plus rail 23 or to the central tap 26.

The output circuit 21 is formed in the example in accordance with FIG. 2 by a single-phase full bridge (H bridge) and is operated as an inverter to generate a single-phase alternating current (load current) in the load circuit 11. In a variation of FIG. 2 the output circuit 21 in one or more of the submodules $5_j$ can be embodied in a different way and for generating different types of load currents, e.g. as a three-phase full bridge (pulse converter) for generating a three-phase alternating current or as a DC-DC converter for generating a DC current, especially for feeding a vehicle on-board network or for charging a low-voltage battery. Such a submodule can also be arranged in a parallel circuit to the series circuit of the submodules $5_j$.

In operation of the converter 3 a battery voltage $u_q$ (FIG. 1) is applied to the converter 3 by the battery 4 via the battery circuit 8. Under the effect of the battery voltage $u_q$ and the inductance 7 a supply current with a battery voltage strength of $i_L$ (abbreviated to "battery current $i_L$" below) flows in the battery circuit 8.

In a drive mode of the converter 3 the submodules 5$_j$ are connected to the battery circuit 8 for feeding the loads 2$_j$ with electrical energy from the battery 4 in an alternating sequence over time. To this end the semiconductor switch 29 in the input bridge 20 of the respective submodule 5$_j$ to be connected is opened, so that the DC link circuit capacitance 22 of this submodule 5$_j$ is switched via the input terminals 9 and 10 and the semiconductor switch 30 into the battery circuit 8. As a rule a number of submodules 5$_j$ are connected in simultaneously in this way.

The other submodule or each remaining submodule 5$_j$ on the other hand is disconnected from the battery circuit 8, in that the input terminals 9 and 10 of this submodule 5$_j$ are short-circuited by the respective semiconductor switch 29 in each case.

For a positive current flow direction of the battery current $i_L$ flowing in the battery circuit 8 the DC link circuit capacitance 22 of the respective submodule 5$_j$ connected is charged from the battery circuit 8, so that the DC link circuit voltage $v_{aj}$ falling via the DC link circuit capacitance changes over time.

The input bridge 20 of the submodule 5$_j$ connected in each case is operated in such cases in conjunction with the inductance 7 as a boost converter. The semiconductor switch 29 is switched on and off in clocked operation for this purpose. The second semiconductor switch 30 of the input bridge 20 is preferably always switched in opposition to the semiconductor switch 29.

In a feedback mode the converter 3 can alternatively also be employed for feeding back electrical energy into the battery circuit 8. During generation of a negative current flow direction in the battery circuit 8 the input bridges 20 of the submodules 5$_j$ are activated and deactivated alternately especially in clocked operation once again. Also in feedback mode the semiconductor switch 29 is preferably always activated in opposition to the semiconductor switch 30 in this case.

For activation of the semiconductor switches 29 and 30 of each submodule 5$_j$ the gate terminals of the semiconductor switches 29 and 30 each have a binary input control signal applied to them by the control unit 6, which is also referred to below as the switching position parameter $q_j$ (with j=1, 2, ..., n). In the exemplary embodiment each of the switching position parameters $q_j$ has the value "1", when the associated submodule 5$_j$ is disconnected from the battery circuit 8 (semiconductor switch 29 closed, semiconductor switch 30 opened). Each of the switching position parameters $q_j$ on the other hand has the value "0" when the associated submodule 5$_j$ is connected to the battery circuit 8 (semiconductor switch 29 opened, semiconductor switch 30 closed). In respect of its time curve each switching position parameter $q_j$ corresponds to a pulse signal with periodic clocking (i.e. a pulse and a pulse interval within a constant clock cycle in each case) and varying duty cycle $d_j$ (j=1, 2, ..., n).

In return the control unit 6 receives a measured value of the respective link circuit voltage $v_{aj}$ from the submodules 5$_j$ as an input variable. The DC link circuit voltage $v_{aj}$ is tapped for this purpose in each submodule 5 in each case by means of a measuring converter 31 (FIG. 2) which supplies the control unit 6 with a voltage signal proportional to the respective DC link circuit voltage $v_{aj}$.

As further input variables the control unit 6 obtains a measured value (the current strength) of the output current $i_{aj}$ (j=1, 2, ..., n) from each submodule 5$_j$, which flows out on the load side in the DC link circuit 25 of the respective submodule 5$_j$. The respective output current $i_{aj}$ is tapped off by a measurement converter 32 connected into the DC link circuit (FIG. 2). As an alternative the respective output current $i_{aj}$ is determined computationally on the basis of the measured load-side AC currents and the switching positions of the output bridges 21.

In addition the control unit 6 receives a measured value (the current strength) of the battery current $i_L$, which is tapped off by a measurement converter 33 (FIG. 1) in the battery circuit 8.

The DC link circuit voltages $v_{aj}$ of the submodules 5 are regulated by the control unit to a voltage target value $v_{ajs}$ (with j=1, 2, ..., n) assigned in each case. The voltage target values $v_{ajs}$ in such cases, in the general application case of the inventive converter 3, are predetermined specifically for each submodule 5 and can be accordingly optionally defined with the same or with a different amount. The control unit 6 also controls the battery current $i_L$ in addition to the closed-loop control of the DC link circuit voltages $v_{aj}$.

Figure 3:
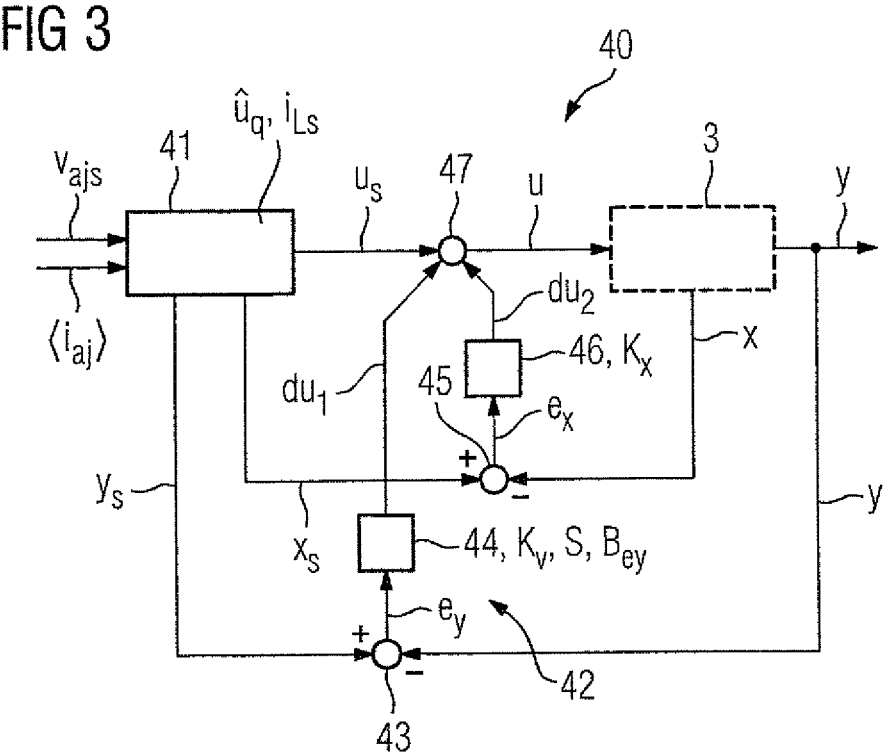
FIG. 3 shows a schematic block circuit diagram of the functional layout of the control unit embodied as the closed-loop control structure with two degrees of freedom according to the present invention.

The control unit 6 is formed by a microcontroller, in which the functionality for automatically carrying out the closed-loop control outlined here is implemented in software by a control program (firmware). The functional layout of this control program is shown schematically in FIG. 3. In this figure the control unit 6 is embodied functionally as a closed-loop control structure 40 with two degrees of freedom with a pilot control 41 and closed-loop subsequent error control 42 connected downstream therefrom.

The pilot control 41 receives as input variables the voltage target values $v_{ajs}$ of the DC link circuit voltages $v_{aj}$ and also the temporal average current values $\langle i_{aj} \rangle$ of the measured output currents $i_{aj}$. The average current values $\langle i_{aj} \rangle$ are generated by means of a recursive average value filter (not shown in any greater detail) which with each new measurement of the output currents $i_{aj}$, calculates an updated value of the respective average current value $\langle i_{aj} \rangle$ by weighted summation of the previous average current value $\langle i_{aj} \rangle$ with the new measured value of the output current $i_{aj}$:

$$w \cdot i_{aj} + (1-w) \cdot \langle i_{aj} \rangle \rightarrow \langle i_{aj} \rangle \qquad \text{EQ. 1}$$

The parameter w (0<w<1) in EQ. 1 stands here for an empirically selectable weighting parameter.

Furthermore a constant assumed value $\hat{u}_q$ for the battery voltage $u_q$ is permanently predetermined to the pilot control 41.

On the basis of the voltage target values $v_{ajs}$ of the DC link circuit voltages $v_{aj}$, of the average current values $\langle i_{aj} \rangle$ and of the predetermined assumed value $\hat{u}_q$, the pilot control 41 calculates a target value $d_{js}$ (j=1, 2, ..., n) for each duty cycle $d_j$ in a way explained in greater detail below.

The pilot control 41 preferably outputs the target values $d_{js}$ in such cases in the form of a target setting variable vector $u_s$ with $$u_s = [d_{1s}, d_{2s}, \ldots, d_{ns}]^T \qquad \text{EQ. 2}$$

to the closed-loop subsequent error control 42. The notation $[\ldots]^T$ here identifies the transposed (in the mathematical sense) value of the specified row vector. In other words $u_s$ is generated and processed in the mathematical sense as a column vector.

Furthermore the pilot control 41 determines a target value $i_{Ls}$ for the battery current $i_L$. The pilot control 41 preferably forms a target output variable vector $y_s$ from the target values $v_{ajs}$ of the DC link circuit voltages $v_{aj}$ with $$y_s = [v_{a1s}, v_{a2s}, \ldots, v_{ans}]^T \qquad \text{EQ. 3}$$

and also a target state variable vector $x_s$ from the target values $i_{Ls}$ and $v_{ajs}$ of the battery current $i_L$ or of the DC link circuit voltages $v_{aj}$ $$x_s = [i_{Ls}, v_{a1s}, v_{a2s}, \ldots, v_{ans}]^T \qquad \text{EQ. 4}$$

and supplies these vectors $y_s$ and $x_s$ to the closed-loop subsequent error control 42.

The closed-loop subsequent error control 42 compares the target output variable vector $y_s$ in a differentiation element 43 with an output variable vector y containing the actual values of the DC link circuit voltages $v_{aj}$ measured at the converter 3:

$$y=[v_{a1},v_{a2},\ldots,v_{an}]^T \qquad \text{EQ. 5}$$

An output error signal $e_y$ resulting from this $$e_y=[v_{a1s}-v_{a1},v_{a2s}-v_{a2},\ldots,v_{ans}-v_{an}]^T \qquad \text{EQ. 6}$$

is supplied within the closed-loop subsequent error control 42 to a closed-loop output control 44, which by multiplication with a control parameter $K_v$, calculates a first correction variable $du_1$ in accordance with $$du_1=K_v \cdot v, \qquad \text{EQ. 7}$$

with $$\frac{dv}{dt} = S \cdot v + B_{ey} \cdot e_y. \qquad \text{EQ. 8}$$

The regulation parameter $K_v$, as well as the parameters S and $B_{ey}$, each have the mathematical form of an n×n matrix. The correction variable $du_1$ and the variables v each have the mathematical form of an n-dimensional column vector. In accordance with normal convention the notation d/dt stands for the temporal change (i.e. the derivation after the time t). The parameter S is given in most application cases by the null matrix (S=0). The above equation thus reduces as a rule to $$dv/dt = B_{ey} \cdot e_y, \qquad \text{EQ. 9}$$

through which an integration in the closed-loop output control 44 is carried out.

In individual cases the parameter S can be occupied by various values other than zero (see e.g. Annex 3).

The target state variable vector $x_s$ is compared, in closed-loop subsequent error control 42 in a differential element 45 with a state variable vector x, which contains the actual values of the battery current $i_L$ measured at the converter 3 and also the DC link circuit voltages $v_{aj}$:

$$x=[i_L,v_{a1},v_{a2},\ldots,v_{an}]^T \qquad \text{EQ. 10}$$

A state error signal $e_x$ resulting from this comparison with $$e_x=[i_{Ls}-i_L,v_{a1s}-v_{a1},v_{a2s}-v_{a2},\ldots,v_{ans}-v_{an}]^T \qquad \text{EQ. 11}$$

is supplied within the closed-loop subsequent error control 42 to a closed-loop state control 46, which, by multiplication with a regulation parameter $K_x$, calculates a second correction variable $du_2$ in accordance with $$du_2=K_x \cdot e_x. \qquad \text{EQ. 12}$$

The closed-loop control parameter $K_x$ and the correction variable $du_2$ in their turn have the mathematical form of an n×n matrix of an n-dimensional column vector.

The correction variables $du_1$ and $du_2$ are summed in a summation element 47 with the target setting variable vector $u_s$. A setting variable vector u resulting from this with $$u=u_s+du_1+du_2, \qquad \text{EQ. 13}$$

which contains the actual duty cycles $d_j$ to be set $$u=[d_1,d_2,\ldots,d_n]^T, \qquad \text{EQ. 14}$$

is supplied in the way described above to the converter 3. The duty cycles $d_j$ contained in the setting variable vector u are naturally restricted in each case to a range of values from $0 \leq d_j \leq 1$. Optionally a closed-loop output control 44 can additionally be supplied in a manner known per se with a correction signal of an anti-windup structure, provided the setting variable vector u contains duty cycles $d_j$ outside the range of values $0 \leq d_j \leq 1$.

During operation of the converter 3 the pilot control 41 guides the system. In this case the average current values $\langle i_{aj} \rangle$ of the output currents $i_{aj}$ entered into the pilot control 41 determine the target value $i_{Ls}$ of the battery current strength $i_L$. The closed-loop subsequent error control 42 merely has to compensate for subsequent errors and mapping inaccuracies of the pilot control 41 and therefore only intervenes a little into the system behavior. The integral component of the closed-loop control provided in the closed-loop output control 44 balances out fluctuations in the battery voltage $u_q$, without said voltage having to be measured for this purpose. In addition the integral component of the closed-loop control structure 40 with two degrees of freedom lends robustness.

The pilot control 41 is based on an approximate inverse mathematical mapping of the electrical system formed by the converter 3.

The pilot control 41 is based here on a mathematical model of the converter 3, which relates the currents and voltages to one another in the converter 3 according to Kirchhoffs rules:

$$\frac{dx}{dt} = \begin{bmatrix} -\frac{R_i}{L} & -\frac{(1-q_1)}{L} & -\frac{(1-q_2)}{L} & \cdots & -\frac{(1-q_n)}{L} \\ \frac{(1-q_1)}{C_1} & -\frac{1}{R_1 C_1} & 0 & \cdots & 0 \\ \frac{(1-q_2)}{C_2} & 0 & -\frac{1}{R_2 C_2} & \cdots & 0 \\ \vdots & \vdots & \vdots & \ddots & \vdots \\ \frac{(1-q_n)}{C_n} & 0 & 0 & \cdots & -\frac{1}{R_n C_n} \end{bmatrix} \cdot x + \begin{pmatrix} 0 \\ -\frac{i_{a1}}{C_1} \\ -\frac{i_{a2}}{C_2} \\ \vdots \\ -\frac{i_{an}}{C_n} \end{pmatrix} + \begin{pmatrix} \frac{1}{L} \\ 0 \\ 0 \\ \vdots \\ 0 \end{pmatrix} \cdot u_q \qquad \text{EQ. 15}$$

In this equation $R_i$ is the internal resistance of the battery 4
L is the inductance 7
$R_j$ is the assumed loss resistance of the output circuit 21 in submodule $5_j$ (j=1, 2, ..., n) and
$C_j$ is the DC link circuit capacitance 22 of the submodule $5_j$ (j=1, 2, ..., n).

For the purpose of pilot control 41 this model is modified such that the switch position parameters $q_j$ will always be replaced by the respective associated duty cycle $d_j$.

$$\frac{dx}{dt} = \begin{bmatrix} -\frac{R_i}{L} & -\frac{(1-d_1)}{L} & -\frac{(1-d_2)}{L} & \cdots & -\frac{(1-d_n)}{L} \\ \frac{(1-d_1)}{C_1} & -\frac{1}{R_1 C_1} & 0 & \cdots & 0 \\ \frac{(1-d_2)}{C_2} & 0 & -\frac{1}{R_2 C_2} & \cdots & 0 \\ \vdots & \vdots & \vdots & \ddots & \vdots \\ \frac{(1-d_n)}{C_n} & 0 & 0 & \cdots & -\frac{1}{R_n C_n} \end{bmatrix} \cdot x + \qquad \text{EQ. 16}$$

-continued $$\begin{pmatrix} 0 \\ -\frac{i_{a1}}{C_1} \\ -\frac{i_{a2}}{C_2} \\ \vdots \\ -\frac{i_{an}}{C_n} \end{pmatrix} + \begin{pmatrix} \frac{1}{L} \\ 0 \\ 0 \\ \vdots \\ 0 \end{pmatrix} \cdot u_q$$

In addition
The temporal change in the state variable vector x is ignored (dx/dt=0),
the time-discrete values of the output currents $i_{aj}$ are always replaced by the assigned average current value $\langle i_{aj} \rangle$,
the actual battery voltage $u_g$ is replaced by the assumed value $\hat{u}_q$,
the state variable vector x is replaced by the target state variable vector $x_s$, and
the duty cycles $d_j$ are replaced by the respective assigned target value $d_{js}$. In addition the state variable vector is replaced by the target state variable vector $x_s$.
Thus EQ. 16 reduces to $$0 = \begin{bmatrix} -\frac{R_i}{L} & -\frac{(1-d_{1s})}{L} & -\frac{(1-d_{2s})}{L} & \cdots & -\frac{(1-d_{ns})}{L} \\ \frac{(1-d_{1s})}{C_1} & -\frac{1}{R_1 C_1} & 0 & \cdots & 0 \\ \frac{(1-d_{2s})}{C_2} & 0 & -\frac{1}{R_2 C_2} & \cdots & 0 \\ \vdots & \vdots & \vdots & \ddots & \vdots \\ \frac{(1-d_{ns})}{C_n} & 0 & 0 & \cdots & -\frac{1}{R_n C_n} \end{bmatrix} \cdot x_s +$$

$$\begin{pmatrix} 0 \\ -\frac{\langle i_{a1} \rangle}{C_1} \\ -\frac{\langle i_{a2} \rangle}{C_2} \\ \vdots \\ -\frac{\langle i_{an} \rangle}{C_n} \end{pmatrix} + \begin{pmatrix} \frac{1}{L} \\ 0 \\ 0 \\ \vdots \\ 0 \end{pmatrix} \cdot \hat{u}_q,$$

EQ. 17 the right-hand side of which is referred to as function $f(i_{Ls}, u_s)$.

The modified model of the converter 3 in accordance with EQ. 17 is resolved by the pilot control 41 after insertion of the voltage target values $v_{ajs}$ specified as input variables and the average current values $\langle i_{aj} \rangle$, by the pilot control 41 minimizing the quadratic norm of the function $f(i_{Ls}, u_s)$ by means of an iterative optimization method while varying the target values $i_{Ls}$ and $d_{js}$, $$\min\{\|f(i_{Ls}, u_s)\|_2 : i_{Ls} \in R, u_s \in R^n\} \to i_{Ls}, u_s,$$
EQ. 18 wherein R stands for the quantity of real numbers.

For this purpose the pilot control 41 uses a suitable optimization algorithm, especially what is referred to as the Levenberg-Marquardt algorithm. The pilot control 41 assumes $i_{Ls} = d_{js} = 0$ as start values for the optimization.

Figure 4:
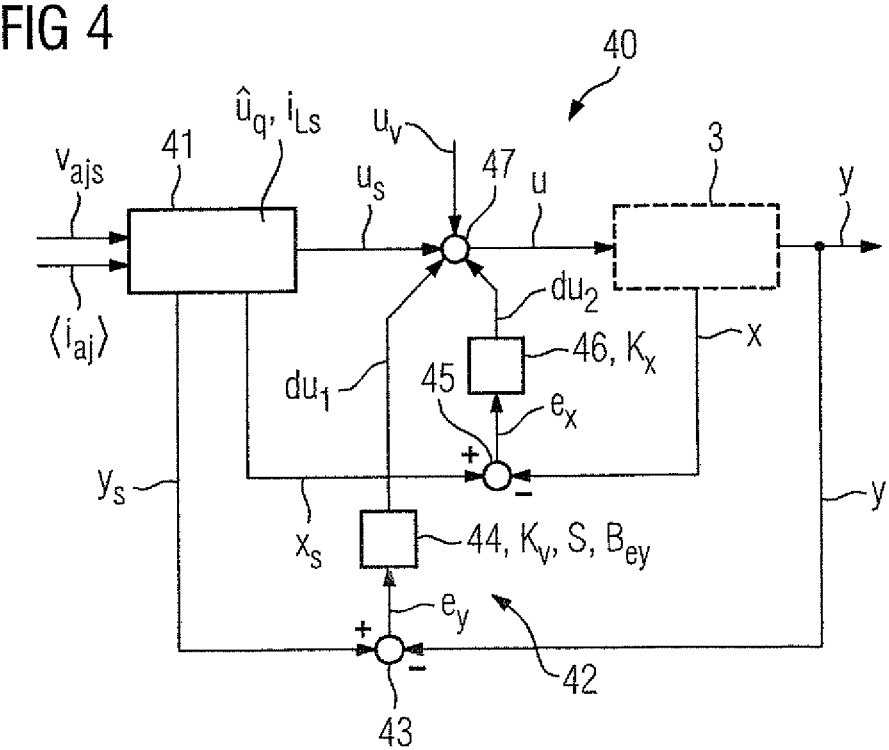
FIG. 4 shows an alternate design of the control unit in accordance with FIG. 3.

In an expanded version of the closed-loop control structure 40 with two degrees of freedom in accordance with FIG. 4, the target setting variable vector $u_s$ will additionally be modified in the summation element 47 by a periodic compensation signal $u_v$ in the form $$u_v = [u_{v1}, u_{v2}, \ldots, u_{vn}]^T$$
EQ. 19

$$= [k \cdot (1 - \sin(2\varphi_\omega + \varphi_1)), k \cdot (1 - \sin(2\varphi_\omega + \varphi_2)), \ldots,$$

$$k \cdot (1 - \sin(2\varphi_\omega + \varphi_n))]^T$$

$$u = u_s + du_1 + du_2 + u_v$$
EQ. 20

In the above equation $\phi_\omega$ stands for an angle of rotation with $$\varphi_\omega = \int_0^\tau \omega_{el}(t') \cdot dt',$$
EQ. 21 wherein $\omega_{ei}$ refers to the rotational frequency of the load currents. The size $\phi_j$ (with j=1, 2, ..., n) refers to a phase offset of the load current for the respective submodule $\mathbf{2}_j$. The parameter k can be set empirically and, depending on battery voltage, $u_q$ in the range of values $0 \leq k \leq 0.5$.

Ripples of the DC link circuit voltages $v_{aj}$ as a result of currents which especially occur in single-phase AC consumers as loads $\mathbf{2}_j$ can be effectively reduced by the compensation signal $u_v$. However in an expedient embodiment of the method, for very small output frequencies, the compensation signal $u_v$ for its part can be switched off, since the closed-loop output control 44 can operate the compensation of the voltage fluctuations more effectively under these circumstances.

In quasi mains mode of the converter 3, i.e. with an essentially constant rotational frequency $\omega_{ei}$ of the load currents generated by the submodules $\mathbf{5}_j$, the voltage fluctuations caused by the ripples of the output currents $i_{aj}$ can as an alternative also be compensated for in accordance with Annex 3 by the closed-loop output control 44.

The closed-loop control parameters $K_v$, $K_x$ and the further parameters $B_{ey}$ of the closed-loop output control 44 can basically be determined empirically. Preferably the closed-loop control parameters $K_v$, $K_x$ can however be calculated in accordance with Annex 1 by linearization and development of the system by one or more working points.

As an alternative to the measuring detection described here, the battery voltage $u_g$ and/or the battery current $i_L$ can also be determined in accordance with Annex 2 by state reconstruction.

The target values $v_{ajs}$ of the DC link circuit voltages $v_{aj}$ are preferably predetermined to be the same values for all submodules $\mathbf{5}_j$ and are especially defined such that their sum corresponds to double the battery voltage $u_q$ $$v_{ajs} = \frac{2}{n} \cdot u_q.$$
EQ. 22

With this dimensioning, differences in power of the individual submodules $\mathbf{5}_j$ in boost mode of the converter 2 can be balanced out in the best possible way.

The stability of the closed-loop control structure 40 with two degrees of freedom is constantly monitored by the control unit 6. As part of this monitoring, if at least one of the duty cycles $d_j$ becomes saturated, i.e. assumes a limit value of 0 or 1 for more than a predetermined period of time, the target values for the DC link circuit voltages $v_{aj}$ can be temporarily increased or reduced. In this way unstable states of the closed-loop control structure 40 with two degrees of freedom can be avoided.

Evidently the function of the pilot control 41 of the closed-loop control structure 40 with two degrees of freedom can be disrupted with disappearing battery current $i_L$ ($i_L$=0) and small load currents $i_{aj}$ ($i_{aj} \approx 0$) since in this case fluctuations and measurement imprecisions of the output currents $i_{aj}$ have a critical effect on the results of the calculation within the pilot control 41.

It is known that the control unit 6 achieves an effective error clearance of the pilot control 41 here in that, instead of the submodule-specific average current values $\langle i_{aj} \rangle$, it once again employs its average value $$\langle i_a \rangle = \frac{1}{n} \cdot \sum_{j=1}^{n} \langle i_{aj} \rangle \qquad \text{EQ. 23}$$

as the input variable for the pilot control 41.

The invention is not restricted to the exemplary embodiments described here. Instead further embodiments of the invention can be derived by the person skilled in the art from the present description and the following Annexes.

Annex 1: System Linearization and Development

EQ. 16 can be rewritten into $$\frac{dx}{dt} = \dot{x} = f(x, u) + z_i + z_q \qquad \text{EQ. A1.1}$$

with $$f(x, u) = \begin{pmatrix} -\frac{R_i}{L} \cdot i_L - \frac{(1-d_1)}{L} \cdot v_{a1} - \frac{(1-d_2)}{L} \cdot v_{a2} - \\ \cdots - \frac{(1-d_n)}{L} \cdot v_{an} \frac{(1-d_1)}{C_1} \cdot i_L - \frac{1}{R_1 C_1} \cdot v_{a1} \\ \frac{(1-d_2)}{C_2} \cdot i_L - \frac{1}{R_2 C_2} \cdot v_{a2} \\ \vdots \\ \frac{(1-d_n)}{C_n} \cdot i_L - \frac{1}{R_n C_n} \cdot v_{an} \end{pmatrix};$$

$$z_i = \begin{pmatrix} 0 \\ -\frac{i_{a1}}{C_1} \\ -\frac{i_{a2}}{C_2} \\ \vdots \\ -\frac{i_{an}}{C_n} \end{pmatrix} \text{ and } z_q = \begin{pmatrix} \frac{1}{L} \\ 0 \\ 0 \\ \vdots \\ 0 \end{pmatrix} \cdot u_q$$

The following also applies $$x = [i_L, v_{a1}, v_{a2}, \ldots v_{an}]^T \text{ and } h(x) = y = [v_{a1}, v_{a2}, \ldots, v_{an}]^T$$

The system is operated in working point AP with $$x = x_{AP}, u = u_{AP} \text{ and } i_a = i_{AP}.$$

Around this working point AP a system linearization takes place, from which for small deviations $\Delta x$ and $\Delta u$ from the working point of the system description is $$\Delta \dot{x} = A \cdot \Delta x + B \cdot \Delta u \text{ and } \Delta y = C \cdot \Delta x \qquad \text{EQ. A1.2}$$

with the Jacobi matrices $$A = \frac{\partial f(x, u)}{\partial x}\bigg|_{AP} + \frac{\partial z_i}{\partial i_a}\bigg|_{AP}; B = \frac{\partial (f(x, u))}{\partial u}\bigg|_{AP}; C = \frac{\partial h(x)}{\partial x}$$

For the faults $z_i$ and $z_q$, $\Delta z_i$=0 and $\Delta z_q$=0 should apply. The row development for the working point linearization is aborted after the first row element.

As a rule the linearized system description is expanded in accordance with EQ. A1.2 by an integral component $$\dot{v} = \frac{dv}{dt} = S \cdot v + B_{ey} \cdot e_y \text{ with} \qquad \text{EQ. A1.3}$$

$$S = 0$$

This produces the expanded path $$\Delta \dot{x}_e = A_e \cdot x_e + B_e \cdot u \qquad \text{EQ. A1.4}$$

with $$A_e = \begin{pmatrix} A & 0 \\ B_{ey} C & 0 \end{pmatrix}; B_e = \begin{pmatrix} B \\ 0 \end{pmatrix} \text{ and } x_e = \begin{pmatrix} x \\ v \end{pmatrix}.$$

For stabilization of the expanded system the feedback $$u = -(K_x \quad K_v) \cdot \begin{pmatrix} x \\ v \end{pmatrix}$$

is employed, which is generally designed for a number of working points AP.

The time-discrete values of the output currents $i_{aj}$ are preferably replaced in the above calculation by the average current values $\langle i_{aj} \rangle$. Likewise the setting variable vector u is preferably replaced in the above calculation by the setting variable vector $u_s$.

Annex 2: Reconstruction of the Battery Voltage and/or of the Battery Current

For the model in accordance with EQ. 16, with $z_i = u_q$, the assumed relationship is $$\frac{dx_b}{dt} = \dot{x}_b = \qquad \text{EQ. A2.1}$$

$$\begin{bmatrix} -\frac{R_i}{L} & -\frac{(1-d_1)}{L} & -\frac{(1-d_2)}{L} & \cdots & -\frac{(1-d_n)}{L} & \frac{1}{L} \\ \frac{(1-d_1)}{C_1} & -\frac{1}{R_1 C_1} & 0 & \cdots & 0 & 0 \\ \frac{(1-d_2)}{C_2} & 0 & -\frac{1}{R_2 C_2} & \cdots & 0 & 0 \\ \vdots & \vdots & \vdots & \ddots & \vdots & \vdots \\ \frac{(1-d_n)}{C_n} & 0 & 0 & \cdots & -\frac{1}{R_n C_n} & 0 \\ 0 & 0 & 0 & \cdots & 0 & 0 \end{bmatrix}.$$

$$x_b + \begin{pmatrix} 0 \\ -\frac{i_{a1}}{C_1} \\ -\frac{i_{a2}}{C_2} \\ \vdots \\ -\frac{i_{an}}{C_n} \\ 0 \end{pmatrix}$$

and $y=[v_{a1}, v_{a2}, \ldots, v_{an}]^T$ with the expanded state vector $x_b=[i_L, v_{a1}, v_{a2}, \ldots, v_{an}, Z_I]^T$.

EQ. A2.1 is summarized as follows:

$$\dot{x}_b = f_b(x_b, u) + z_{ib} \qquad \text{EQ. A2.2}$$

By means of the state reconstruction the battery voltage $u_q$ and the battery current $i_L$ are now determined without direct measurement. For this purpose an observer in the general form $$\dot{\hat{x}}_b = f_b(\hat{x}_b, u) + z_{ib} + L(y - \hat{y}) \qquad \text{EQ. A2.3}$$

$$\hat{y} = [\hat{v}_{a1}, \hat{v}_{a2}, \ldots, \hat{v}_{an}]^T$$

is implemented in the control unit 6.

The observer includes all states for reconstruction. Typically an observer in accordance with Luenberger is used. Other methods such as e.g. a Kalman filtering can however likewise be used within the framework of the invention.

As an alternative just the battery current $i_L$ can be reconstructed with the observer structure. The battery voltage $u_q$ is measured in this case or estimated by the constant assumed value $\hat{u}_q$.

The time-discrete values of the output currents $i_{aj}$ are preferably replaced in the above calculation by their average current values $\langle i_{aj} \rangle$.

Annex 3: Closed-Loop Control in Quasi Mains Mode

The compensation for voltage fluctuations as a result of rippling of the output currents $i_{aj}$ described in conjunction with FIG. 4 requires knowledge of the rotational frequency $\omega_{ei}$ as well as the electrical phase angle $\phi_j$ ($j=1, 2, \ldots, n$). Provided the rotational frequency $\omega_{ei}$ is approximately constant, the compensation can also be undertaken by implementing a corresponding interference model in the closed-loop output control 44.

For this purpose each row of the (column-vectoral) EQ. 8 is written as $$\begin{pmatrix} \dot{v}_{j1} \\ \dot{v}_{j2} \end{pmatrix} = \underbrace{\begin{pmatrix} 0 & 1 \\ -(2\omega_{ei})^2 & 0 \end{pmatrix}}_{S_i} \cdot \begin{pmatrix} v_{j1} \\ v_{j2} \end{pmatrix} + B_{eyj} \cdot e_{yj} \qquad \text{EQ. A3.1}$$

with $j=1, 2, \ldots, n$.

Provided an approximately sinusoidal interference with the frequency $2\omega_{ei}$, as is typically caused by single-phase AC consumers as loads $2_j$, is present in the error signal $e_{yj}$, the interference model is excited with its inherent frequency. The states v are echoed, but are stabilized by the feedback $u=-K_v \cdot v$. If the states v are restricted, the fault can no longer be contained in the DC link circuit voltages $v_{aj}$.

In order to not only compensate for the basic frequency of the interference but also for any harmonics which might be present, further oscillators with correspondingly high inherent frequencies can also be used in the closed-loop output control 44.

The method described here has the advantage of only requiring the DC link circuit voltages $v_{aj}$ to be detected by measurement and of especially not requiring any knowledge of the phase offset $\phi_j$ of the loads $2_j$ to be available.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating a modular high-frequency converter having a plurality of submodules with input-side half bridge connected in series via an inductance to a supply circuit supplied by a DC voltage source, with each of the input-side half bridge having a DC link circuit with a DC link circuit capacitance connected across an output of the input-side half bridge, the method comprising:
   clocking the associated input-side half bridge with a predetermined duty cycle so as to connect the DC link circuit capacitance of each input-side half bridge to the supply circuit,
   controlling a DC link circuit voltage drop across the DC link circuit capacitance of each submodule to a predetermined DC link voltage target value by adjusting the predetermined duty cycle with a closed-loop control structure having a pilot control and a closed-loop error control connected downstream of the pilot control,
   determining, for the pilot control, with a model that approximately mathematically models an interaction of currents and voltages in the supply circuit and currents and voltages in the submodules, a target duty cycle value for the predetermined duty cycle of each submodule and a target current value for a supply current supplied by the supply circuit, based on load-side output currents flowing out from the DC link circuits and based on the predetermined DC link voltage target values,
   in the model, replacing switch position parameters that map an effect of switch positions of the input-side half bridges based on the determined duty cycle value, and
   operating the converter with the replaced switch position parameters.

2. The method of claim 1, wherein changes over time in the DC link circuit voltages and in the supply current are neglected in the model.

3. The method of claim 1, wherein time-discrete measured values of the load-side output currents are used as input variables for the model.

4. The method of claim 1, wherein time-averaged values of the load-side output currents are used as input variables for the model.

5. The method of claim 4, wherein the time-averaged values of the load-side output currents are determined by using a recursive mean value filter.

6. The method of claim 1, wherein a target value for each duty cycle and a target value for the supply current are determined by numerically solving of the model by using an iterative optimization method.

7. The method of claim 1, wherein a voltage of the DC voltage source is used as an additional input variable for the model.

8. The method of claim 7, wherein the voltage of the DC voltage source is a predetermined constant value.

9. The method of claim 7, wherein the voltage of the DC voltage source is a value reconstructed by state reconstruction.

10. The method of claim 9, wherein a value for the supply current of the DC voltage source determined from state reconstruction is used for the closed-loop error control.

11. The method of claim 1, further comprising applying a periodic compensation signal applied to the duty cycles outputted by the closed-loop control structure so as to completely or partially compensate a periodic fault of the DC link circuit voltages.

12. A modular high-frequency converter, comprising:

a plurality of submodules having input sides connected in series via an inductance in a supply circuit supplied by a DC voltage source, wherein each submodule comprises an input-side half bridge, a DC link circuit connected downstream of the input-side half bridge and a DC link circuit capacitance connected in parallel with the input-side half bridge, and a control device configured to automatically clock the associated input-side half bridge with a predetermined duty cycle so as to connect the DC link circuit capacitance of each input-side half bridge to the supply circuit, control a DC link circuit voltage drop across the DC link circuit capacitance of each submodule to a predetermined DC link voltage target value by adjusting the predetermined duty cycle with a closed-loop control structure having a pilot control and a closed-loop error control connected downstream of the pilot control, determine, for the pilot control, with a model that approximately mathematically models an interaction of currents and voltages in the supply circuit and currents and voltages in the submodules, a target duty cycle value for the predetermined duty cycle of each submodule and a target current value for a supply current supplied by the supply circuit, based on load-side output currents flowing out from the DC link circuits and based on the predetermined DC link voltage target values, in the model, replace switch position parameters that map an effect of switch positions of the input-side half bridges based on the determined duty cycle value, and operate the converter with the replaced switch position parameters.

* * * * *